US012162046B2

(12) United States Patent
Godbole et al.

(10) Patent No.: US 12,162,046 B2
(45) Date of Patent: Dec. 10, 2024

(54) CLEANING SYSTEM FOR CORE SAMPLES AND METHOD OF CLEANING CORE SAMPLES

(71) Applicant: SAUDI ARABIAN OIL COMPANY, Dhahran (SA)

(72) Inventors: Atul Godbole, Dhahran (SA); Sultan Muhammad Al Enezi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 101 days.

(21) Appl. No.: 17/647,419

(22) Filed: Jan. 7, 2022

(65) Prior Publication Data

US 2023/0219118 A1 Jul. 13, 2023

(51) Int. Cl.

| | |
|---|---|
| ***B08B 3/00*** | (2006.01) |
| ***B08B 3/10*** | (2006.01) |
| ***B08B 13/00*** | (2006.01) |
| ***E21B 41/00*** | (2006.01) |

(52) U.S. Cl.
CPC ................ *B08B 3/10* (2013.01); *B08B 13/00* (2013.01); *B08B 2203/007* (2013.01)

(58) Field of Classification Search
CPC ...... B08B 3/10; B08B 13/00; B08B 2203/007
See application file for complete search history.

(56) References Cited

U.S. PATENT DOCUMENTS 2,617,719 A * 11/1952 Stewart .............. G01N 15/0806 134/40
4,687,523 A * 8/1987 Hall ......................... G01N 1/34 134/30

(Continued)

FOREIGN PATENT DOCUMENTS

CN 104668233 A * 6/2015 ............ B08B 13/00
CN 204523649 U * 8/2015

(Continued)

OTHER PUBLICATIONS

Machine Translation of CN 104668233 A to Gu et al. (Year: 2015).*

(Continued)

*Primary Examiner* — Benjamin L Osterhout
(74) *Attorney, Agent, or Firm* — Osha Bergman Watanabe & Burton LLP

(57) ABSTRACT

A cleaning system for oil and gas core samples includes a vapor extraction chamber configured to receive and drain liquid solvents, a movable portion including a movable tray, a lid and a sample cooler, a heater configured to provide heat to the chamber to produce heated and vaporized solvents, a vapor extraction chamber chiller, a controller, and a dryer. A method of cleaning oil and gas core samples includes a vapor extraction step and a drying step. The vapor extraction step includes transferring core samples into and sealing the vapor extraction chamber, heating liquid solvents and maintaining an elevated temperature and a positive pressure in the chamber until an extraction time expires, cooling and transferring the core samples out of the chamber. The drying step includes transferring the cleaned core samples into a dryer, drying the core samples until substantially free of solvents, and cooling the core samples.

13 Claims, 4 Drawing Sheets

(56) References Cited

U.S. PATENT DOCUMENTS

| | | | | |
|---|---|---|---|---|
| 5,377,705 A * | 1/1995 | Smith, Jr. | B08B 7/0021 134/107 |
| 5,759,425 A | 6/1998 | Miyazaki et al. | |
| 2014/0102480 A1 | 4/2014 | Pomerantz et al. | |
| 2016/0082484 A1* | 3/2016 | Pomerantz | B08B 3/10 134/58 R |

FOREIGN PATENT DOCUMENTS

| | | | | |
|---|---|---|---|---|
| CN | 205426624 U | * | 8/2016 | |
| CN | 206146713 U | * | 5/2017 | |
| CN | 110132699 A | * | 8/2019 | |
| CN | 108507855 B | * | 9/2020 | G01N 1/08 |
| CN | 113275309 A | * | 8/2021 | |
| CN | 214096855 U | * | 8/2021 | |
| WO | WO-8704790 A | * | 8/1987 | G01N 1/34 |
| WO | 2009126663 A2 | | 10/2009 | |

OTHER PUBLICATIONS

Machine Translation of CN 108507855 B to Chu et al. (Year: 2020).*

Machine Translation of CN 110132699 A to Tang. (Year: 2019).*

Machine Translation of CN 113275309 A to Huang et al. (Year: 2021).*

Machine Translation of CN 204523649 U to Gu et al. (Year: 2015).*

Machine Translation of CN 205426624 U to Dong et al. (Year: 2016).*

Machine Translation of CN 206146713 U to Guo et al. (Year: 2017).*

Machine Translation of CN 214096855 U to Chen et al. (Year: 2021).*

Mohsen Masihi, “Reservoir Rock Properties”, Laboratory Work Book, Sharif University of Technology, No. 26504, 2010 (105 pages).

Gant et al.; “Core Cleaning for Restoration of Native Wettability”, SPE Formation Evaluation, Mar. 1988, pp. 131-138 (8 pages).

Conley et al.; “A Centrifuge Core Cleaner”, SPE-742-G; Journal of Petroleum Technology; vol. 8; No. 10; Oct. 1, 1956; pp. 61-62 (2 pages).

Guedez et al.; A Novel Non-Destructive and Rapid Cleaning Method for Intact Ultra-Low Permeability Rocks; URTeC: 994; Unconventional Resources Technology Conference; Jul. 2019; pp. 1-20 (20 pages).

Gupta et al.; “Impact of Different Cleaning Methods on Petrophysical Measurements”, Petrophysics; vol. 58; No. 6; Dec. 2017; pp. 613-621 (9 pages).

“Recommended Practices for Core Analysis”, API RP 40; American Petroleum Institute; 1998 Edition; Feb. 1998 (236 pages).

* cited by examiner

CLEANING SYSTEM FOR CORE SAMPLES AND METHOD OF CLEANING CORE SAMPLES

BACKGROUND

When a well is drilled for oil and gas extraction operation, samples of geologic formation ("formation"), such as reservoir rocks, are taken during or after the drilling of a well. Such samples are generally referred to as "core samples" and may include a full diameter core sample, obtained by drilling into the formation ("whole core samples"). Smaller samples obtained from the whole core samples may be referred to as "plug samples" or "core plugs." Lab analyses ("core analyses") are generally conducted to the core samples to study various properties including porosity, permeability, and wettability of the formation.

In conducting core analyses of the core samples, the core samples, whether they are whole core samples or core plugs, must be cleaned prior to the analyses to remove contaminants from the pores of the core samples. The contaminants may include formation fluid, which may include hydrocarbons, water, brine, and other compounds which are not a part of the formation rock, such as mineral precipiates. In general, the cores samples for porosity and/or permeability measurements must be thoroughly extracted of contaminants and then properly dried.

Numerous methods have been conventionally employed for the cleaning of core samples. Such methods may include hot or cool solvent distillation extraction ("Soxhlet extraction"), direct pressure flow through cleaning, centrifuge flushing, supercritical fluid extraction and critical-point drying, gas-driven solvent extraction, liquified gas extraction, and "Huff and Puff" method.

In general, careful selection of an appropriate method is required based on a type of samples to be cleaned. For example, clays may require the samples to remain hydrated during extraction, gypsum may require additional processes during sample preparation, shales may be susceptible to fracture due to expansion at the laminae during the cleaning process, and low American Petroleum Institute (API) gravity oils may require multiple solvents for thorough cleaning.

However, aforementioned conventional processes have limitations and/or require additional considerations. Methods such as Soxhlet extraction, gas driven solvent extraction and liquified gas extraction may pose health and safety concerns because the workers may be exposed to hazardous solvents and solvent fumes during core sample loading and unloading. Soxhlet extraction, flow through cleaning, centrifuge flushing, and "Huff and Puff" methods may be considered as inefficient cleaning methods because the number of samples that can be cleaned per cycle may be limited, such as one whole core sample per cycle. Furthermore, a drip distillation process may cause drip erosion of the samples if the samples are not properly protected Immersion-type process, such as Soxhlet extraction, may cause cross-contamination of the core samples because leached formation fluid and other contaminants may accumulate in the solvents over time, and also the wettability of the samples may alter during the extraction process, in case of hot solvent extraction.

Accordingly, there exists a need for continuing improvement of the core sample cleaning method. Specifically, a more efficient and safer cleaning method is desired, which may include a process that is capable of cleaning a higher number of core samples per cycle, having a reduced cleaning time and reduced exposure of hazardous substances to workders.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate generally to a cleaning system for oil and gas core samples. The system may include a vapor extraction chamber configured to receive and drain one or more liquid solvents, a movable portion including a movable tray, a lid and a sample cooler, a heater configured to provide heat to the vapor extraction chamber to heat and vaporize at least a part of the liquid solvents, a vapor extraction chamber chiller, a controller, and a dryer. The lid may be configured to seal the vapor extraction chamber to contain the heated and vaporized solvents in the vapor extraction chamber without a leakage and maintain a positive pressure in the vapor extraction chamber when the lid is at a close position. The movable tray may be configured to hold the core samples and transfer the core samples into, and out of, the vapor extraction chamber, and the movable tray may be configured to position the core samples in the vapor extraction chamber to expose the core samples to the heated and vaporized solvents without contacting the one or more liquid solvents.

In another aspect, embodiments disclosed herein relate to a method of cleaning oil and gas core samples. The method may include conducting a vapor extraction step to obtain cleaned core samples, and conducting a drying step to obtain cleaned and dried core samples. The vapor extraction step may include transferring core samples into a vapor extraction chamber, sealing the vapor extraction chamber, heating one or more liquid solvents in the vapor extraction chamber to vaporize at least a part of the liquid solvents to produce heated and vaporized solvent, maintaining an elevated temperature and a positive pressure in the vapor extraction chamber until an extraction time expires, cooling the core samples after the extraction time expires until a cleaned core sample unloading temperature is reached, and transferring the core samples out of the vapor extraction chamber to obtain cleaned core samples. The drying step may include transferring the cleaned core samples into a dryer, drying the cleaned core samples in the dryer until the cleaned core samples are substantially free of solvents, and cooling the cleaned core samples until a dried core sample unloading temperature is reached. The core samples may be positioned in the vapor extraction chamber to be exposed to the heated and vaporized solvents without contacting the liquid solvents in the vapor extraction step, and the heated and vaporized solvent may extract contaminants from the core samples by contacting the core samples.

Other aspects and advantages of the claimed subject matter will be apparent from the following description and the appended claims.

DETAILED DESCRIPTION

In one aspect, embodiments herein relate to a cleaning system for oil and gas core samples. The cleaning system of one or more embodiments is a vapor extraction-based system. Contaminants such as formation or reservoir fluid, which may include oil and water, are removed from the core samples by heated and vaporized solvents diffusing into the pore spaces of the core samples. Because the heated and vaporized solvent used to clean core samples may have a substantially higher temperature than the heated liquid solvent used in conventional systems, the contaminant removal efficiency of the present disclosure may be substantially higher than the conventional systems, resulting in reduced cleaning time.

In one or more embodiments, the cleaning system may include an extraction subsystem which may comprise a vapor extraction chamber, a movable portion, a heater, and a chiller, and a drying subsystem which may include a movable portion and a dryer. The cleaning system may also include a controller to automatically control various aspects of the cleaning process.

The "cleaning process" refers to as the entire process of core sample cleaning and includes a vapor extraction process ("extraction process") and a drying process.

Figure 1:
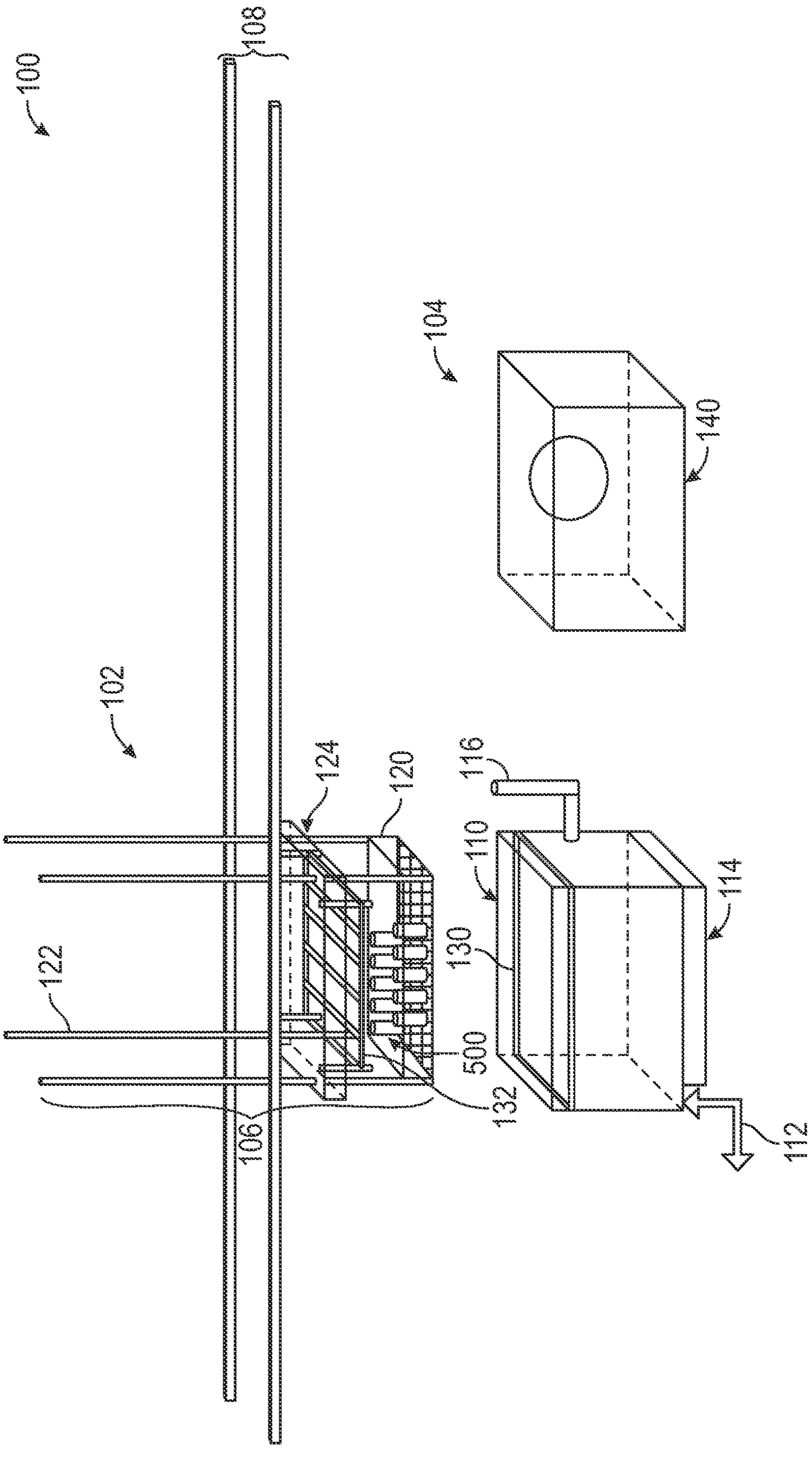
FIG. 1 is a diagram that illustrates the cleaning system for core samples in accordance with one or more embodiments

FIG. 1 is a schematic for a cleaning system for core samples 100, which may include an extraction subsystem 102 and a drying subsystem 104. The extraction subsystem 102 may contain a positive pressure vapor extraction chamber 110 ("vapor extraction chamber") and a movable portion 106. In one or more embodiments, the movable portion 106 may include a movable sample tray 120 ("movable tray") and a vapor extractor chamber lid 124 ("lid"). Core samples 500 to be cleaned are placed on the movable tray 120 prior to the start of the cleaning process. The movable portion 106 may also include a sample cooler 132. The components of the movable portion 106 may be arranged such that the lid 124 is placed at the outer most position, and the sample cooler 132 is positioned between the movable tray 120 and the lid 124. The movable portion 106 may include a guide 122, such as a plurality of rails or rods, to which the movable tray 120, lid 124 and the sample cooler 132 are coupled. The movable portion 106 may also be coupled to a transferring means (not shown in FIG. 1) to allow the movable portion 106 to transfer in and out of the vapor extraction chamber 110. Heat is provided to the vapor extraction chamber 110 by way of a heater 114 which heats and vaporizes liquid solvent contained in the vapor extraction chamber 110. The vapor extraction chamber 110 may include a vapor extraction chamber chiller ("chiller") 130. A pressure vent 116 and solvent input/drain line 112 are coupled to the vapor extraction chamber 110. The solvent input/drain line 112 may also be coupled to a pump which is coupled to a solvent tank and/or a waste solvent tank (not shown in FIG. 1). The guide 122 of the movable portion 106 may be coupled to tracks 108 such that the movable portion 106 may be moved between different sections of the cleaning system including where the vapor extraction chamber 110 and the dryer 140 are located. The drying subsystem 104 may include the movable portion 106 and a dryer 140.

Figure 2:
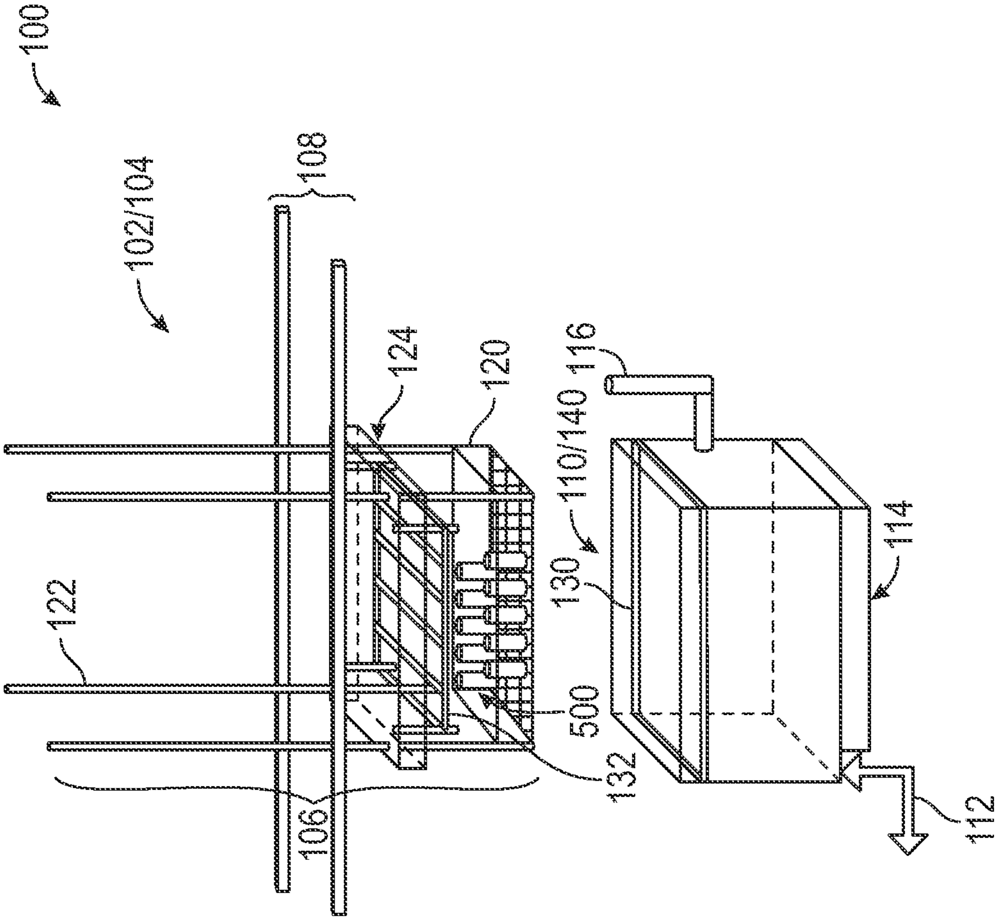
FIG. 2 is a diagram that illustrates the cleaning system for core samples in accordance with one or more embodiments.

FIG. 2 is a schematic for a cleaning system 100, which the vapor extraction chamber 110 may function as a dryer 140 such that the extraction subsystem 102 and the drying subsystem 104 include the same components.

The vapor extraction process of one or more embodiments may allow effective removal of contaminants. "Contaminants" in the present disclosure refers to as the substances in or on the core samples which are not a part of the formation rock. Contaminants may include, but are not limited to, formation or reservoir fluid, which may include hydrocarbon such as heavy oil, water and brine. The contaminants may also include mineral salts and precipitates, and other compounds introduced by the fluid used in oil and gas operations, such as the compounds included in the drilling and injection fluid.

In one or more embodiments, the vapor extraction process may remove contaminants, which may be a formation fluid, from the core sample by adsorbing vaporized solvent onto the formation fluid in the core samples and reducing the viscosity of the formation fluid. Specifically, the vaporized solvent may contact a surface portion of the formation fluid ("transition zone"), gradually reducing the viscosity of the formation fluid in the transition zone. The formation fluid with reduced viscosity may flow out of the core sample due to the gravitational force, exposing the portion of the formation fluid having the original viscosity to the vaporized solvent. The above process continues until the entirety of the formation fluid flows out of the core samples. The formation fluid may also contain asphaltenes, which may exist in the pores of the core sample as a precipitate. In addition, the pores of the core samples may also contain contaminants as a solid substance, such as mineral salt precipitates insoluble in water. The vapor extraction process of one or more embodiments may allow such precipitates/solid substances to flow out of the core sample with the formation fluid with reduced viscosity.

Extraction Subsystem

In one or more embodiments, the extraction subsystem may contain a vapor extraction chamber in which the extraction process takes place and a movable portion which may include a movable tray, lid, sample cooler and a guide.

In one or more embodiments, the vapor extraction chamber may be any vessel that is capable of containing liquid and vapor solvents without leakage. In one or more embodiments, the vapor extraction chamber may be a pressure vessel which is capable of withstanding elevated internal temperature and positive internal pressure conditions. The vapor extraction chamber may be made of a metal such as stainless steel, a composite material, or any other materials that meet the design requirements of the vapor extraction chamber.

In one or more embodiments, the vapor extraction chamber may be designed to withstand a positive internal pressure ("positive pressure") when the lid is in the closed position. A positive pressure refers to the amount of pressure applied in the vapor extraction chamber over the atmospheric pressure. For example, a positive pressure of 15 psi means 15 psi over the atmospheric pressure, or the absolute pressure of approximately 30 psi, if the atmospheric pressure is assumed to be approximately 15 psi. In one or more embodiments, the vapor extraction chamber may be designed to have a maximum allowable working pressure (a maximum positive pressure at which the vessel may be operated safely) ranging from a lower limit selected from one of 5 pounds per square inch (psi), 10 psi, 20 psi, 30 psi, 40 psi, and 50 psi, to an upper limit selected from one of 75 psi, 100 psi, 125 psi, 150 psi, or 200 psi, where any lower limit may be paired with any upper limit.

In one or more embodiments, the vapor extraction chamber may be designed to withstand an elevated temperature. The maximum allowable working temperature of the vapor extraction chamber may range from a lower limit selected from one of 150° C., 200° C., and 250° C., to an upper limit selected from one of 300° C., 350° C., 400° C., 450° C., 500° C., and 600° C., where any lower limit may be paired with any upper limit.

In one or more embodiments, the vapor extraction chamber may be configured to receive heat from a heater and contain liquid solvent at a portion of the chamber where the heat is being received. In one or more embodiments, the vapor extraction chamber may contain the liquid solvent at the bottom portion of the chamber such that when the movable portion is transferred into the vapor extraction chamber and the lid is closed, the movable tray and the core samples do not contact the liquid solvent. Such configuration allows the core samples to be cleaned only by heated and vaporized solvent to prevent contamination of core samples by the liquid solvent.

In one or more embodiments, the extraction subsystem may include a heater to heat and vaporize liquid solvent contained in the vapor extraction chamber. In one or more embodiments, the shape of the heater may be flat or contoured, and may be disposed such that the heater is embedded in the vapor extraction chamber wall or in contact with the outer surface of the vapor extraction chamber. There is no limitation on the shape of the heater and the shape may be optimized based on the design of the extraction subsystem. In one or more embodiments, the heater is disposed at the bottom of the vapor extraction chamber such that a surface of the heater is in contact with the bottom outer surface of the vapor extraction chamber.

In other embodiments, the heater may be a heating coil/tube placed inside of the vapor extraction chamber. In one or more embodiments, the heating coil/tube is placed at a location of the vapor extraction chamber where liquid solvent is contained such that the liquid solvent is heated directly by the heating coil/tube.

In one or more embodiments, the heater may be an electrical heater containing a heating element. The heating element may be embedded in a flat or contoured panel, such as aluminum panel, to be placed at the outer surface of the vapor extraction chamber. The heating element may have a shape of a coil/tube to be placed directly inside of the vapor extraction chamber. In other embodiments, the heater may include pipes connected to a fluid heater and the pipes may be heated by hot fluid flowing through the pipes. The pipes may be embedded in a flat or contoured panel, or may have a shape of a coil to be placed directly inside of the vapor extraction chamber. The pipes are not limited to any specific shape, provided a sufficient flow of the hot fluid, and adequate heat for the extraction process are obtained.

In one or more embodiments, the vapor extraction chamber may include a chiller. The chiller may be located inside of the vapor extraction chamber, embedded in the vapor extraction chamber wall, or placed along the outer surface of the vapor extraction chamber. In one or more embodiments, the chiller may be a pipe assembly connected to a fluid refrigeration system and the pipe assembly is chilled by cold fluid flowing through. The pipe assembly may be straight, have a shape of a coil, or any other suitable shapes to allow the chiller to be placed at a desired location.

In one or more embodiments, the vapor extraction chamber may include a solvent input/drain line. In one or more embodiments, the vapor extraction chamber may include one input/drain line which is used to introduce liquid solvent into, and drain the liquid solvent from, the vapor extraction chamber. In other embodiments, the vapor extraction chamber may have an input line and a drain line, and the liquid solvent introduction and draining may be conducted using separate lines. In one or more embodiments, the vapor extraction chamber may have a plurality of input lines such that different solvents may be directly added to the vapor extraction chamber in desired quantities.

In one or more embodiments, the vapor extraction chamber may include a pressure vent to mitigate unintentional pressure increase in the vapor extraction chamber or to allow a manual pressure control of the vapor extraction chamber. The pressure vent may be a pressure relief valve, or any other mechanism which allow a portion of the vapor in the vapor extraction chamber to escape while preventing the vapor from leaving the vapor extraction chamber under a normal operating condition. In one or more embodiments, the pressure vent may be configured to release the vapor when the internal pressure reaches a set value, and continue to release until the internal pressure drops below the set value. The set value for the pressure vent may be any value suitable for a safe operation of the cleaning system, or a value determined by any other reasons. The set value may be a fraction of the maximum allowable working pressure of the vapor extraction chamber, and may have a range from a lower limit selected from one of 20%, 30%, and 40%, to an upper limit selected from one of 50%, 55%, 60%, 65%, 70%, 75%, 80%, 85%, 90% or 95%, of the maximum allowable working pressure of the vapor extraction chamber, where any lower limit may be paired with any upper limit.

In one or more embodiments, the extraction subsystem may include a movable portion which may include a movable tray, a lid, a guide and a sample cooler. The movable tray of one or more embodiments are configured to hold core sample and may be capable of holding a plurality of core samples while providing sufficient space between the core samples such that sufficient vapor flow may be obtained between the samples. In one or more embodiments, the movable tray may be a perforated tray to allow vapor to flow perpendicular to the bottom portion of the perforated tray. In other embodiments, the movable tray may be made of a mesh material, or any other types of material or tray design which allow sufficient vapor flow around the entire surface of the core samples.

In the present disclosure, the term "core samples" may refer to as a whole core sample, or a full diameter core sample, obtained by drilling vertically into the formation, or a "core plug" which is a smaller sample cut from the full diameter core sample in the axial direction or a longitudinal direction. The full diameter core samples may have a diameter ranging from about 1.5 inches to 6 inches, while the core plug samples may have a diameter ranging from about 1 inches to 1.5 inches. In one or more embodiments, the movable tray may have dimensions to allow placement of 40 or 50 whole core samples, or 150 or more core plug samples with sufficient space between the samples.

In one or more embodiments, the movable tray may be configured to move into and out of the vapor extraction chamber such that the core samples may be transferred in and out of the vapor extraction chamber without being unloaded from the movable tray. In one or more embodiments, the movable tray may enter and exit from the top portion of the vapor extraction chamber, as illustrated in FIG. 1. In other embodiments, the movable tray may enter and exit from the side or the bottom of the vapor extraction chamber.

In one or more embodiments, the movable portion may include a lid configured to move towards and away from the vapor extraction chamber along with the movable tray and the chiller, and seal the vapor extraction chamber. The lid may be considered at an "open" position when the movable portion is at a distance sufficiently away from the vapor extraction chamber such that the loading and unloading of core samples or transfer of the movable portion along the track may be performed. The lid may be considered at a "close" position when the movable portion including the lid is transferred into the vapor extraction chamber and the lid covers the vapor extraction chamber with sufficient force that the vapor extraction chamber is sealed. In one or more embodiments, the lid may include a feature, such as a gasket or a diaphragm, to provide adequate sealing when the lid is at a closed position. In other embodiments, the lid may further include a locking mechanism, such as latches, to provide additional seal to the vapor extraction chamber.

In the present disclosure, a "sealed" vapor extraction chamber refers to a vapor extraction chamber with the lid in the close position such that when the vapor extraction chamber is under a positive pressure, heated and vaporized solvent is prevented from leaving the vapor extraction chamber (vapor "leakage") completely, or the leakage is kept below a maximum allowable value. The amount of leakage may be determined by consulting various standardized leak test methods, and the maximum allowable leakage value may be established by consulting various health and safety standards (such as permissible exposure limits) established by organizations such as Occupational Safety and Health Administration (OSHA) such that the leakage does not pose any health, explosion or fire hazards.

In one or more embodiments, the movable portion may include a sample cooler. The sample cooler may be placed above the moving tray or any other suitable locations to lower the temperature of the core samples. In one or more embodiments, the sample cooler may be a pipe assembly connected to a fluid chiller and the pipe assembly is chilled by a cold fluid flowing through. In other embodiments, the sample cooler may be any device which provides air flow through the core samples ("fan"). In one or more embodiments, the sample cooler may be a combination of the pipe assembly and a fan. The sample cooler may be coupled to any components of the movable portion. In one or more embodiments, the sample cooler may be coupled to the lid. In other embodiments, the sample cooler may be coupled to a guide.

In one or more embodiments, the movable portion may include a guide. The guide directs the movable portion towards and away from the vapor extraction chamber. The guide may be coupled to any of the components of the movable portion including the moving tray, lid and the sample cooler. In one or more embodiments, the guide may be any structure that is coupled to any of the components of the movable portion and that facilitates the directing of the movable portion into and out of the vapor extraction chamber. In one or more embodiments the guide may be one or a plurality of rods or rails. In other embodiments, the guide may be a hinge to which any of the components of the movable portion may be coupled to.

In one or more embodiments, the movable portion may be coupled to a transferring means such as pneumatic and hydraulic cylinders, or a mechanical transferring means including a rack and a pinion, a pulley and a pulling means such as a rope, chain or a band. The transferring means may be operated pneumatically with compressed air or gas, hydraulically with a liquid, mechanically with a motor, or a combination thereof.

Drying Subsystem

In one or more embodiments, the drying subsystem may include a dryer and a movable portion. In one or more embodiments, the movable portion of the drying subsystem may be the same movable portion used in the extraction subsystem. In other embodiments, the drying subsystem may have a dedicated movable portion.

In one or more embodiments, the dryer may be any conventionally available drying chamber or an oven. The dryer may include a radiant, conductive, convective heat source, or a combination thereof. The dryer may have a convectional airflow, or may be a vacuum dryer. In one or more embodiments, the dryer may be heated electrically, by hot fluids, or by burning fuels. In one or more embodiments, the dryer may be operated by other energy source, such as microwaves.

In one or more embodiments, the dryer may include an air blower to further increase the sample drying efficiency. In one or more embodiments, the dryer is designed and configured such that the movable tray, lid and the sample cooler may be operated in the same manner as described in the extraction subsystem section. In one or more embodiments, the dryer may have an opening on one side, such as the top portion, such that the movable portion may be transferred into and out of the dryer. In one or more embodiments, the movable tray may be configured to move in and out of the dryer, and the lid may be configured to seal the dryer such that the emission of residual solvents from the core samples may be contained in the dryer.

In one or more embodiments, the dryer may include chemical sensors, such as hydrocarbon sensors, which detect the presence of various volatile components and determine the concentration level. In one or more embodiments, the chemical sensors may detect the solvents used in the vapor extraction process and determine the concentration level.

In one or more embodiments, the dryer may include an exhaust to remove volatile components and a pressure vent to allow the vapor to escape in case of unintentional pressure increase.

Figures 3A, 3B, 3C, 3D:
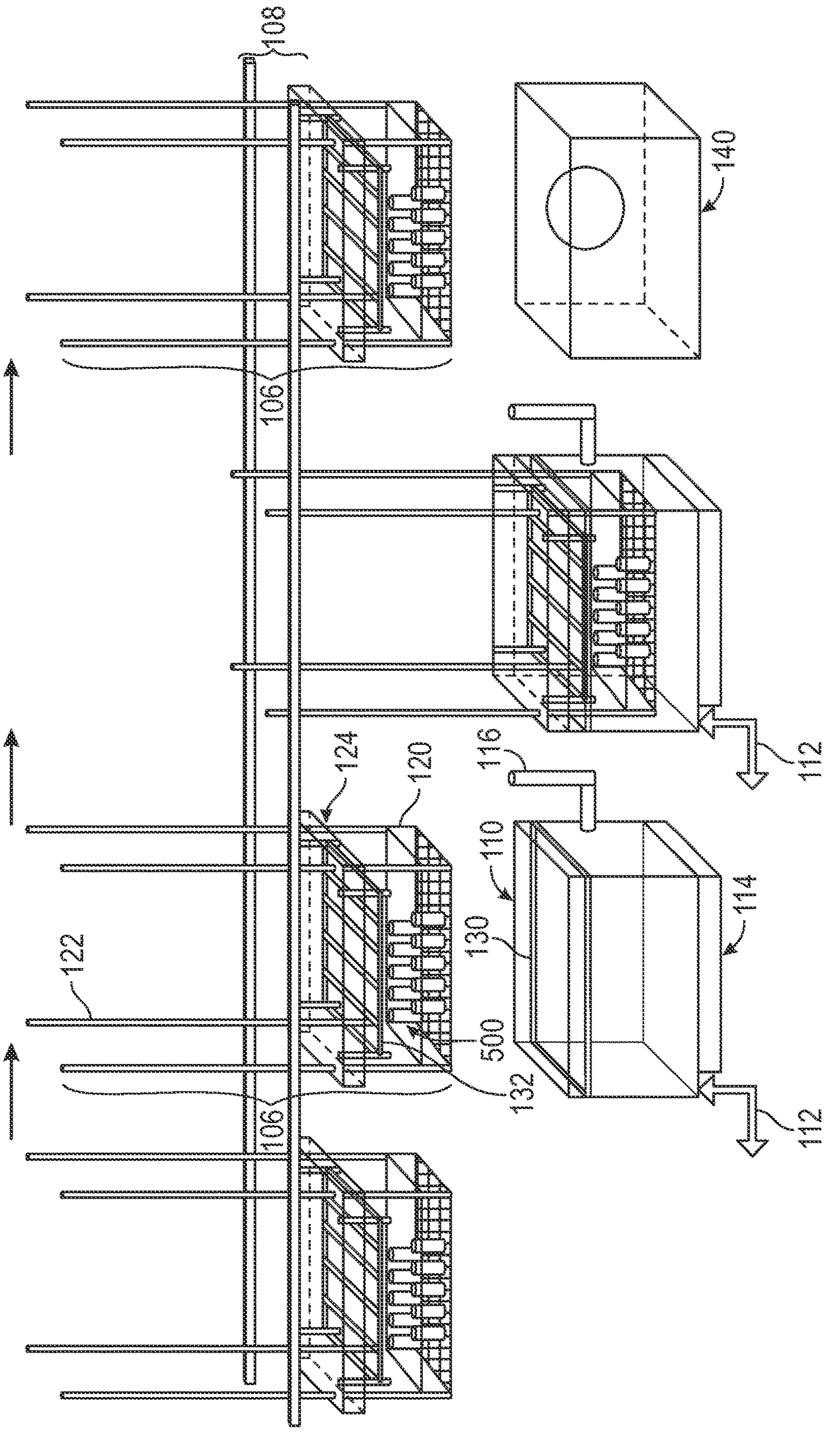
FIG. 3(A)-FIG. 3(D) are diagrams that illustrate the method of cleaning core samples in accordance with one or more embodiments

In one or more embodiments, the dryer is a stand-alone unit separate from the vapor extraction chamber, and the movable parts mounted on tracks may be transferred between the vapor extraction chamber and the dryer, as illustrated in FIGS. 3(B) and 3(D).

In other embodiments, the vapor pressure chamber may be configured to operate as a dryer. In one or more embodiments, the liquid solvent and the heated and vaporized solvent may be removed from the vapor extraction chamber after the core samples are cleaned, and the core samples may be dried using the vapor extraction chamber as a dryer, as illustrated in FIG. 2.

In one or more embodiments, the cleaning system may include one or more tracks which allow the movable portion to be moved such that one movable portion may be incorporated into the extraction subsystem and the drying subsystem. The tracks may be any structure that allows the movable portion to be coupled to and transferred between different sections of the cleaning system, such as between where the vapor extraction chamber and the dryer are located. The tracks may be configured such that the movable portion may be moved to areas other than where the vapor extraction chamber and the dryers are located. Such areas may include an area where the loading and unloading of the core samples may take place, or an area where downstream processes may take place, such as analyses of the core samples. In one or more embodiments, the tracks may be a plurality of railing or rods to which the guide or other portions of the movable portion may be coupled to. The tracks may include a gantry-type structure to allow the movable portion to be moved vertically and horizontally. Such structure is well-known in the art and a person of ordinary skill in the art may rely on the available knowledge to obtain and optimize the design of the tracks and how the tracks and the movable portion are coupled together.

Controller

In one or more embodiments, the cleaning system may include a controller to automatically regulate and adjust various aspects of the cleaning process of the core sample. The controller may be an analog or digital-based system, and in one or more embodiments, the controller may be a computer-based system. In one or more embodiments, the controller is configured to control the movement of the movable portion. The movement may include transferring of the movable portion towards and away from the vapor extraction chamber and the dryer, transferring the movable portion between the area where vapor extraction chamber and the dryer are located, and areas outside of the cleaning system.

In one or more embodiments, the controller may be configured to adjust the process parameters during vapor extraction and drying process. In one or more embodiments, the process parameters may include, but are not limited to, vapor extraction chamber temperature, pressure, vapor extraction time, dryer temperature, pressure and drying time. In one or more embodiments, the controller may adjust the process parameters based on the sensors incorporated into the cleaning system. Such sensors may include, but are not limited to, temperature sensors, pressure sensors, sensors to determine the concentration of heated and vaporized solvents, and sensors to determine the contaminant level in the liquid solvents in the vapor extraction chamber. In other embodiments, the controller may be coupled to the solvent input/drain lines and/or pressure vent such that the flow of liquid solvent through input/drain lines and/or release of heated and vaporized solvent may be controlled based on the desired conditions. In one or more embodiments, the controller may be configured to incorporate the control of the movable portion movement and the adjustment of the process parameters such that the entire cleaning process is automated.

Method of Cleaning Core Samples

Figure 4:
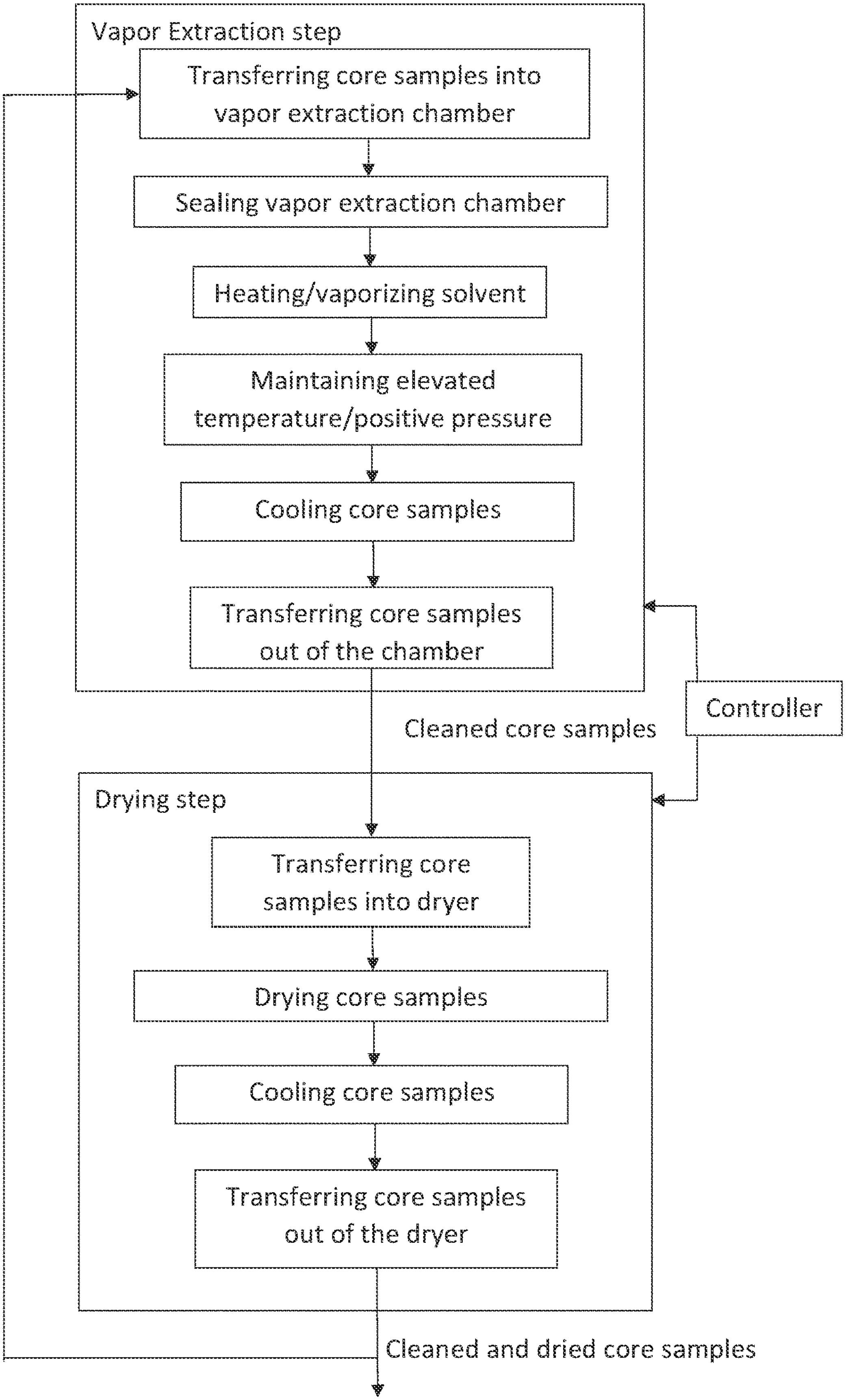
FIG. 4 is a flow diagram that illustrates the method of cleaning core samples in accordance with one or more embodiments.

In one aspect, embodiments herein relate to a method of cleaning oil and gas core samples. FIG. 4 is a flow chart of the method of cleaning core samples that illustrate the steps included in the method. The method may include conducting a vapor extraction step comprising transferring core samples into a vapor extraction chamber, sealing the vapor extraction chamber, heating one or more liquid solvents in the vapor extraction chamber to vaporize at least a part of the one or more liquid solvents to produce heated and vaporized solvent, maintaining an elevated temperature and a positive pressure in the vapor extraction chamber until an extraction time expires, cooling the core samples after the expiration of extraction time until a cleaned core sample unloading temperature is reached, and transferring core samples out of the vapor extraction chamber, to obtain cleaned core samples.

In one or more embodiments, the method may also include conducing the drying step comprising transferring the cleaned core samples in a dryer, drying the cleaned core samples until the cleaned core samples are substantially free of solvents, cooling the cleaned core samples until a dried core sample unloading temperature is reached, to obtain cleaned and dried core samples.

In one or more embodiments, the method may include introducing samples to the movable tray. The core samples may be introduced to the movable tray manually or may be introduced automatically using a device such as a robotic arm. In one or more embodiments, the movable portion including the movable tray may be placed in a specific area designated for the loading of the core samples, as illustrated in FIG. 3(A). The movable portion containing the core samples may then be moved to the location where the vapor extraction chamber is located by way of using the tracks, as illustrated in FIG. 3(B). In other embodiments, the core samples may be introduced to the movable tray when the lid of the movable portion is at the open position in the extraction subsystem, as illustrated in FIG. 3(B). The core samples may be introduced to the movable tray such that sufficient space is provided between the core samples for efficient extraction. In one or more embodiments, sufficient space may be defined as a distance between the core samples selected from one of 0.1 cm or more, 0.2 cm or more, 0.3 cm or more, 0.4 cm or more, or 0.5 cm or more.

In one or more embodiments, the method may include introducing liquid solvent into the vapor extraction chamber. The liquid solvent may be introduced manually through the opening of the vapor extraction chamber, or the liquid solvent may be fed through the solvent input/drain line. In one or more embodiments, one or more types of liquid solvents may be introduced into the vapor extraction chamber. If a plurality of liquid solvents are used for the extraction process, the plurality of the liquid solvents may be introduced sequentially, simultaneously, or the plurality of the liquid solvents may be premixed and introduced into the vapor extraction chamber. In one or more embodiments, the liquid solvents may include, but are not limited to, toluene, xylene and methanol In one or more embodiments, the liquid solvent may also include methylene chloride, hexane, chloroform, acetone, tetrahydrofuran, cyclohexane, ethylene chloride 1-2 dichloro ethane, trichloroethylene, tetrachloroethylene, and naphtha.

In one or more embodiments, the method may include introducing the core samples into the vapor extraction chamber. The core samples may be introduced into the vapor extraction chamber by moving the movable portion toward and into the vapor extraction chamber. In one or more embodiments, the core samples may be introduced into the vapor chamber to place the core samples at a location inside of the vapor extraction chamber such that the core samples are not in contact with the liquid solvent. In one or more embodiments, introduction of core samples into the vapor extraction chamber may be achieved by moving the movable portion with the controller. In one or more embodiments, the method may include starting the vapor extraction chamber chiller and lowering the chiller temperature to a predetermined value before introducing the core samples into the vapor extraction chamber. The predetermined value of the chiller temperature is not limited to any specific temperature and may be 1, 5, 8, 10, or 15° C. In one or more embodiments, the movable portion containing the core samples may be transferred from the sample loading area to the vicinity of the vapor extraction chamber using the tracks before introducing the core samples into the vapor extraction chamber. In one or more embodiments, the transfer of the movable portion may be carried out by the controller.

In one or more embodiments, the method may include moving the lid from an open position to a close position. In one or more embodiments, the movable portion may be designed such that the movable tray and the lid are moved separately, allowing the core samples to be introduced into the vapor extraction chamber first and then the lid may be moved from the open position to the close position. In other embodiments, introduction of the core samples into the vapor extraction chamber and closing the lid may be performed simultaneously.

In one or more embodiments, the method may include sealing the vapor extraction chamber such that no leakage of heated and vaporized solvent occurs during the extraction process. In one or more embodiments, sealing the vapor extraction chamber may be achieved by moving the lid to the closed position. FIG. 3(C) shows the cleaning system which the movable tray is placed in the vapor extraction chamber and the lid is at the close position, sealing the vapor extraction chamber.

In one or more embodiments, the method may include heating the liquid solvent and vaporizing at least a portion of the liquid solvents in the vapor extraction chamber to produce heated and vaporized solvent. The temperature at which the liquid solvent is heated may be adjusted according to the boiling point and vapor pressure of the liquid solvent. In one or more embodiments, the liquid solvent may be heated such that the internal temperature of the vapor extraction chamber, or extraction temperature, may be at a temperature ranging from a lower limit selected from one of 40, 50, 60, 70, 80, 90 and 100° C. to an upper limit selected from one of 130, 140, 150, 160, 170, 180, 190, 200, 250° C., where any lower limit may be paired with any upper limit.

In one or more embodiments, heating of the liquid solvent is conducted such that the heated and vaporized solvent provides positive pressure in the vapor extraction chamber for efficient extraction of the core samples. In one or more embodiments, the liquid solvent may be heated such that the internal pressure of the vapor extraction chamber, or an extraction pressure, is at a positive pressure ranging from a lower limit selected from one of 0.5, 1, 5, 10, 15, 20, 25, and 30 psi to the upper limit selected from 40, 50, 60, 70, 80, 90, 100, 150, 200, 300, 400, 500, and 1000 psi, where any lower limit may be paired with any upper limit.

In one or more embodiments, the method may include contacting the core samples with heated and vaporized solvent to remove contaminants which may include reservoir or formation fluid and contents of drilling fluid which the core samples may be exposed to during drilling operation. By allowing the core samples to be contacted only with the heated and vaporized solvent and preventing the liquid solvent from contacting the core samples, re-introduction of removed contaminants to the cleaned core samples may be avoided.

In one or more embodiments, the method may include maintaining the extraction temperature and the extraction pressure to extract contaminants from the core samples until an extraction cycle is completed. In one or more embodiments, the extraction cycle may be completed when the extraction temperature and the extraction pressure is maintained for a predetermined period of time, which may be referred to as an "extraction time." In other embodiments, the change in the concentration of the contaminants in the liquid solvent in the vapor extraction chamber may be monitored and the extraction cycle is completed when the change in the concentration of the contaminants becomes negligible.

In one or more embodiments, the method may include cooling the core samples until the internal temperature of the vapor extraction chamber reaches an unloading temperature, or a cleaned core sample unloading temperature. The cleaned core sample unloading temperature may be an ambient temperature or any temperature at which it is considered suitable to remove the core samples from the vapor extraction chamber, such as 25, 30, 40, 50, 60, 70, or 80° C. In one or more embodiments, the core samples may be cooled by operating the sample cooler and optionally, the vapor extraction chamber chiller. During the cooling step of the core samples, heat may be turned off and the liquid solvent may be drained through the solvent input/drain line.

In one or more embodiments, the method may include transferring core samples out of the vapor extraction chamber. The core samples may be transferred out of the vapor extraction chamber by moving the movable portion out of, and away from the vapor extraction chamber. In one or more embodiments, transferring the core samples out of the vapor extraction chamber may be achieved by moving the movable portion with the controller. In one or more embodiments, the lid may be moved from the close position to open position before the movable tray is moved out of and away from the vapor extraction chamber. In other embodiments, the lid and movable tray may be moved simultaneously to transfer the core samples out of the vapor extraction chamber.

In one or more embodiments, the method may include transferring the movable portion containing the cleaned core samples from the vicinity of the vapor extraction chamber to the vicinity of the dryer by using the tracks. In one or more embodiments, the transfer may be carried out by the controller.

In one or more embodiments, the method may include introducing the core samples into the dryer. The core samples may be introduced into the dryer by moving the movable portion toward and into the dryer. In one or more embodiments, introduction of core samples into the dryer may be achieved by moving the movable portion with the controller. In one or more embodiments, the method may include moving the lid from an open position to a close position. In one or more embodiments, the movable portion may be designed such that the movable tray and the lid may be moved separately, allowing the core samples to be introduced into the dryer first and then the lid may be moved from the open position to the close position. In other embodiments, introduction of the core samples into the dryer and closing the lid may be performed simultaneously.

In one or more embodiments, the method may include sealing the dryer such that no leakage of heated and vaporized solvent occurs during the drying process. In one or more embodiments, sealing the dryer may be achieved by moving the lid to the closed position.

In one or more embodiments, the method may include drying the cleaned core samples in the dry until the cleaned core samples are substantially free of solvents. There is no limitation on the suitable drying temperature and drying time, and suitable drying temperature and drying time may be determined based on the size and a number of core samples, the types of solvent used, properties of the core samples, and the like. Core samples that are "substantially free of solvents" may be defined as core samples that do not emit more than the maximum allowable level of solvent when exposed to a drying condition as described below. The maximum allowable level of solvent may be 0, 1, 5, 10, 20, 30, 40, 50, 100, 250, 500, and 1000 ppm, and the emitted solvent may be detected by the sensor included in the dryer.

Alternatively, whether the core samples are substantially free of solvents or not may be determined by obtaining the weight of the core samples during the drying process, and calculating the % difference of the core sample weight before and after a predetermined time interval. The core sample may be considered substantially free of solvents when the % difference of the core sample weight that is being dried is less than about 1%, such as 1%, 0.5%, 0.1%, 0.01%, or 0.001%, over a predetermined time interval, such as 1 hour, 2 hours, 5 hours, 10 hours, 20 hours, or 24 hours. In one or more embodiments, the cleaning system may include an internal scale which allows the weight of the core sample to be measured without removing the core sample from the vapor extraction chamber or the dryer.

In one or more embodiments, the drying process may be conducted at a drying temperature ranging from a lower limit selected from one of 30, 40, 50, 60, 65° C. to an upper limit selected from one of 70, 80, 90, 100, 110, 120, 130, 140, 150, 160, 170, 180, 190 and 200° C., where any lower limit may be paired with any upper limit. In one or more embodiments, the drying temperature may be 65, 66, 67, 68, 69, 70 or 110° C. In other embodiments, the drying process may include gradually increasing the temperature from the ambient temperature to the drying temperature, such as heating at a rate of 1, 2, 3, 4, 5, 10, 15, 20° C./min.

In one or more embodiments, the drying process may be conducted for a duration ranging from a lower limit selected from one of 0.25, 0.5, 0.75, 1, 2 and 3 hours, to an upper limit selected from one of 5, 10, 15, 20, 50, 100, 200, 500, and 1000 hours, where any lower limit may be paired with any upper limit. In one or more embodiments, the drying process may be conducted for a duration of 6, 7, or 8 hours.

In one or more embodiments, the method may include cooling the core samples until the internal temperature of the dryer reaches an unloading temperature, or "a dried core sample unloading temperature." The dried core sample unloading temperature may be an ambient temperature or any temperature at which it is considered suitable to remove the core samples from the dryer, such as 25, 30, 40, 50, 60, 70, or 80° C. In one or more embodiments, the core samples may be cooled by operating the sample cooler.

In one or more embodiments, the method may include transferring core samples out of the dryer to obtain cleaned and dried core samples. The core samples may be transferred out of the dryer by moving the movable portion out of and away from the dryer. In one or more embodiments, transferring the core samples out of the dryer may be achieved by moving the movable portion with the controller. In one or more embodiments, the lid may be moved from the close position to open position before the movable tray is moved out of and away from the dryer to move the core samples out of the dryer. In other embodiments, the lid and movable tray may be moved simultaneously to transfer the core samples out of the dryer.

In one or more embodiments, the method may include repeating the entirety or a part of the vapor extraction step and drying step. There are no limits on the number of repeats, or iterations, and the method may be repeated as many times as required to obtain adequately cleaned and dried core samples. In one or more embodiments, the cleaning process may be repeated with the same processing parameters and the solvents. In other embodiments, the cleaning process may be repeated with different solvents and process parameters, or any part of the vapor extraction and/or drying steps may be skipped. In one or more embodiments, the first iteration of the cleaning process may be conducted with toluene and xylene and the second iteration may be conducted with methanol.

EXAMPLES

A cleaning system in accordance with one or more embodiments was built and core sample cleaning was conducted using the cleaning system (Example 1). The cleaning system of Example 1 is compared to various conventional core sample cleaning processes (Reference Example 1-8). Table 1 shows various features and operation characteristics of Example 1 and Reference Examples 1-8.

TABLE 1

| | Process | Extraction Medium | Number of Samples per Batch | Cleaning Time (days) | Operator Solvent Exposure |
|---|---|---|---|---|---|
| Example 1 | vapor extraction | heated and vaporized solvent | 500 core plugs/50-75 whole core | 4-7 | minimal |
| Reference Example 1 | hot solvent Soxhlet/hot air oven drying | liquid solvent | 25-30 core plugs/1 whole core | 4-7 | substantial |
| Reference Example 2 | cool solvent Soxhlet/humidity oven drying | liquid solvent | 20-25 core plugs/1 whole core | 6-10 | substantial |
| Reference Example 3 | flow through cleaning | liquid solvent | 1 core plug/whole core | 8-10 | minimal |
| Reference Example 4 | centrifuge cleaning | liquid solvent | 10-15 core plugs | 1-2 | minimal |
| Reference Example 5 | Huff and Puff method | $CO_2$ | 1 core plug/whole core | N/A | minimal |
| Reference Example 6 | critical point drying | liquid solvent | 1 core plug/whole core | N/A | minimal |
| Reference Example 7 | gas driven solvent extraction | liquid solvent | 50-100 core plugs/10-20 whole core | N/A | substantial |
| Reference Example 8 | liquified gas extraction | liquid solvent | 5-10 core plugs | N/A | substantial |

As shown in Table 1, the cleaning system of the present disclosure provides improved features such as an increased number of core samples per batch, and reduced cleaning time. In addition, the cleaning system may reduce the operator exposure to hazardous chemicals such as the solvents used in the core sample cleaning process due to its automation features and incorporation of a controller and sensors. The cleaning system may also eliminate cross-contamination of the core samples which occurs in an immersion-type process such as Soxhlet extraction.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A cleaning system for oil and gas core samples, the system comprising a vapor extraction chamber configured to receive and drain one or more liquid solvents;

a movable portion comprising a movable tray, a lid and a sample cooler;

a heater configured to provide heat to the vapor extraction chamber to heat and vaporize at least a part of the one or more liquid solvents to produce heated and vaporized solvents;

a vapor extraction chamber chiller;

a controller; and a dryer, wherein:

the lid is configured to seal the vapor extraction chamber to contain the heated and vaporized solvents in the vapor extraction chamber without a leakage and maintain a positive pressure in the vapor extraction chamber, when the lid is at a close position, the movable tray is configured to hold the core samples and transfer the core samples into, and out of, the vapor extraction chamber, the movable tray is configured to position the core samples in the vapor extraction chamber to expose the core samples to the heated and vaporized solvents without contacting the one or more liquid solvents.

2. The cleaning system of claim 1, wherein the controller is configured to:

transfer the movable portion into and out of, the vapor extraction chamber and the dryer, adjust an extraction temperature, an extraction pressure and an extraction time of the vapor extraction chamber.

3. The cleaning system of claim 1, further comprising a pressure vent, the pressure vent configured to release a part of the heated and vaporized solvents when a pressure inside of the vapor extraction chamber is above a set value.

4. The cleaning system of claim 1, further comprising tracks configured to have the movable portion mounted and transfer the movable portion between the vapor extraction chamber and the dryer.

5. The cleaning system of claim 1, wherein the one or more liquid solvents comprise at least one of toluene, xylene and methanol.

6. The cleaning system of claim 1, wherein the dryer comprises hydrocarbon sensors.

7. The cleaning system of claim 1, further comprising one or more of a solvent input line and a solvent drain line.

8. A method of cleaning oil and gas core samples, the method comprising:

conducting a vapor extraction step to obtain cleaned core samples;

conducting a drying step to obtain cleaned and dried core samples;

wherein:

the conducting the vapor extraction step comprises:

transferring core samples into a vapor extraction chamber, sealing the vapor extraction chamber, heating one or more liquid solvents in the vapor extraction chamber to vaporize at least a part of the one or more liquid solvents to produce heated and vaporized solvent, maintaining an elevated temperature and a positive pressure in the vapor extraction chamber until an extraction time expires, cooling the core samples after the extraction time expires until a cleaned core sample unloading temperature is reached, and transferring the core samples out of the vapor extraction chamber to obtain cleaned core samples, the conducting the drying step comprises:

transferring the cleaned core samples into a dryer, drying the cleaned core samples in the dryer until the cleaned core samples are substantially free of solvents, and cooling the cleaned core samples until a dried core sample unloading temperature is reached, in the vapor extraction step, the core samples are positioned in the vapor extraction chamber to be exposed to the heated and vaporized solvents without contacting the one or more liquid solvents, the heated and vaporized solvent extracts contaminants from the core samples by contacting the core samples.

9. The method of claim 8, wherein the conducting the vapor extraction step and the conducting the drying step are controlled by a controller.

10. The method of claim 8, further comprising repeating, once or more, at least one of the conducting the vapor extraction step and conducting the drying step on cleaned core samples or cleaned and dried core samples.

11. The method of claim 10, wherein the one or more liquid solvents in the conducting the vapor extraction step consists of at least one of toluene and xylene, and the one or more liquid solvents in the repeating the conducting the vapor extraction step consists of methanol.

12. The method of claim 8, wherein the one or more solvents comprise at least one of toluene, xylene and methanol.

13. The method of claim 8, wherein the drying comprises exposing the cleaned core samples to blown air and gradually heating the cleaned core samples to a drying temperature.

* * * * *